United States Patent Office 2,993,017
Patented July 18, 1961

2,993,017
INSULATING COMPOSITION CONTAINING SODIUM CARBOXYMETHYL CELLULOSE, ALUMINUM ACETATE AND POLYVINYL ACETATE
Glenn Sucetti, P.O. Box 1960, Grass Valley, Calif.
No Drawing. Filed Oct. 23, 1958, Ser. No. 769,080
1 Claim. (Cl. 260—17)

This invention relates to insulating materials. More particularly this invention relates to plastic materials that can be applied by hand or by spray to metal surfaces to serve as heat insulation.

The objects and advantages of this invention can be illustrated by the problem of insulating the fuel tanks of diesel locomotives.

Diesel fuels of relatively high viscosity are available for the operation of diesel locomotives. Such high viscosity fuels are considerably more economical than lighter (less viscous) fuels and are quite satisfactory for engine performance, but on railroad divisions where, or at seasons when, the locomotives are subject to low temperatures, the thicker and more economical fuels present a problem. Thus at freezing temperatures such fuels are excessively thick and require application of heat, as by steam coils, to render them sufficiently fluid to be pumped and injected properly.

Heretofore, to my knowledge, no one has provided an adequate insulating material for fuel tanks of diesel locomotives; i.e., adequate to conserve the heat of thick diesel fuels. On the one hand ICC safety regulations forbid very thick applications of insulating material because they make inspection difficult. On the other hand, no material has been provided heretofore which is economical, which can be applied quickly and which, when applied as a thin coat (e.g., ¼") will insulate diesel fuel tanks satisfactorily.

It is an object of the present invention to provide a material which fulfills the above requirements; i.e., which can be prepared and applied economically to metal surfaces to form an adherent, insulating coat.

Other objects will be apparent from the ensuing description and the appended claim.

I have found that a very effective insulating composition can be provided by mixing together a lightweight, porous mineral aggregate, asbestos fibers, an organic binder and a waterproofing agent.

The mineral aggregate may be any porous mineral aggregate having a density not exceeding about 20, preferably not exceeding about 10 pounds per cubic foot. Examples are expanded vermiculite and expanded perlite. However, a mixture of substantial proportions each of expanded vermiculite and expanded perlite are preferred. The vermiculite contributes insulating value, plasticity and toughness and it allows liquid to leak through (which is an important advantage as explained hereinafter). The perlite contributes good insulating properties and strength.

The asbestos adds greatly to the toughness and strength of the end product. It may be substituted by other mineral fibers, e.g., glass fibers. However, asbestos fibers are preferred.

The organic binder is preferably a carboxymethyl cellulose, for example, sodium carboxymethyl cellulose containing about 0.65 to 0.85 sodium carboxymethyl groups ($CH_2COONa$) per anhydroglucose unit. This material functions as a film-forming agent and binder. A suitable commercial product is CMC 70 High of Hercules Powder Co. One of the properties of this material is that it swells when mixed with water. By selecting a finer grind of sodium carboxymethyl cellulose, the time required can be diminished very substantially. In general, water-soluble, film-forming cellulose derivatives may be used, for example, water-soluble methyl cellulose, but sodium carboxymethyl cellulose is preferred.

The organic binder is preferably used in conjunction with a reactant material or setting agent which will insolubilize it and form a water-insoluble film. The preferred insolubilizing agent is basic aluminum acetate. Other polyvalent metal salts and also reactive resins such as urea-formaldehyde resins may be used in place of basic aluminum acetate. The resinous materials mentioned react with the carboxymethyl cellulose apparently by cross-polymerization. The aluminum acetate and other polyvalent metal salts act by replacement of the sodium ion of sodium carboxymethyl cellulose. In either case the effect is one of insolubilization and the formation of a water-insoluble film.

There is also preferably included with the organic binder, a substantial quantity of asbestos fibers. The preferred asbestos is a product of the Phoenix Mine in Napa county, California, which has the following approximate sieve analysis:

| | Percent |
|---|---|
| +20 | 5 |
| +40 | 15 |
| +80 | 20 |
| +100 | 2 |
| +200 | 20 |
| −200 | 38 |

This asbestos is further characterized as follows:

As mined it is crushed to −¾", dried and screened to reject +½" material. The drying is such that it does not drive off water of crystallization. The −½" portion is subjected to hammermilling and the milled material is subjected to air separation. The light fraction is employed in the present invention and it consists partly of granules and partly of fiber. However, other forms of asbestos in fine fiberized form may also be used.

A preferred binder formula for use in accordance with the present invention is as follows:

*Formula A*

| | |
|---|---|
| Asbestos fines | 10 lbs. |
| Sodium carboxymethyl cellulose (Hercules Powder Co. CMC 70 High) | 15 ounces. |
| Basic aluminum acetate | 1 ounce. |

The waterproofing agent is preferably a polyvinyl acetate emulsion. A suitable commercial product is that known as Gelvatex Striping Paint, KD 517. This product, manufactured by Gelvatex Coatings Corporation of Anaheim, California, is a water base, polyvinyl acetate emulsion paint which is composed of pigment (about 23%) and vehicle (about 77%). The vehicle consists of about 30% polyvinyl acetate and 70% water.

In place of polyvinyl acetates other similar resins may be used in emulsified form, e.g., polyvinyl chlorides and polyvinyl acetates.

The following specific example will serve further to illustrate the practice and advantages of my invention:

*Example 1.*—3 cubic feet of plaster grade expanded perlite, 2 cubic feet of No. 4 expanded vermiculite, 50 lbs. of grade 7D asbestos fibers and 25 lbs. of the above Formula A are placed in a dry blender and mixed. The dry mixture is then placed in a wet mixer and soaked with 185 lbs. of water for about 3 minutes with the mixer not operating. Then 133 lbs. of Gelvatex KD 517 are added and the mass is mixed for about 5 minutes. A plastic mix results to which more water may be added for the desired spray consistency. The plastic mix is extruded into waterproof polyethylene bags which are closed and placed in metal containers.

This product can be sprayed onto clean metal surfaces to form ¼" thick layers which bond well to the metal and provide a very effective insulation. It can be applied cold or hot. For example, steam may be injected into the fuel tanks of diesel locomotives to heat them, and the plastic mix of this example sprayed onto the hot outer surface in four coats to form an adherent ¼" coat. Advantageously, this coat is sprayed, while still damp, with a further quantity of the same waterproofing agent or with any other compatible waterproofing agent.

The formula of Example 1, on a dry basis, is as follows:

| Component | Volume, cu. ft. | Weight, lbs. |
|---|---|---|
| Expanded perlite | 3 | 24 |
| Expanded vermiculite | 2 | 18 |
| Asbestos | | 50 |
| Formula A (25 lbs.): | | |
|   Asbestos | | 22.7 |
|   Na carboxymethyl cellulose | | [1] 34.1 |
|   Basic Al acetate | | [1] 2.3 |
| Polyvinyl acetate | | 23 |

[1] Ounces.

Converted to the basis of 100 pounds of total aggregate, the composition of my invention may vary as follows:

Total aggregate _____pounds__ 100
Asbestos (other than included with Formula
  A) _____pounds__ 60 to 250
Formula A_____do____ 30 to 120
Asbestos _____do____ 25 to 100
Na carboxymethyl cellulose_____do____ 2½ to 10
Basic Al acetate_____ounces__ 2½ to 10
Polyvinyl acetate_____pounds__ 25 to 100

In this formulation the aggregate is preferably a mixture of substantial parts each of expanded vermiculite and expanded perlite. As explained above, the vermiculite and perlite provide a good combination of properties such as strength, plasticity while in the state of a wet mix, toughness and high insulating value. Also, the vermiculite contributes another important property which will now be described. In the case of a diesel fuel tank of a locomotive it is important that leaks in the tank become visible quickly and while they are still small. If the protective, insulating coat on a fuel tank is impervious to the fuel, it may hold the fuel back until the leak becomes larger, or the coat may fail and allow leakage at a dangerous location such as a passenger station with resultant hazard to human beings, or in close proximity to wood structures with resultant fire hazard.

It is an important advantage of the plastic mixture of the present invention that, when it is applied as a protective coat, the dry coat allows a liquid such as diesel fuel to leak through in a short time. That is not to say that the coat is "leaky" in the sense of being a poor coat, but by reason of the porous vermiculite it allows liquid to percolate through. Such will stain or discolor the exterior surface to an extent that it will reveal the existence and location of the flaw in the tank.

Formula A need not be used. Thus a mixture of carboxymethyl cellulose (or other binder as explained above) and basic aluminum acetate (or other setting agent) may be used. However, the presence of asbestos in Formula A is preferred. The polyvinyl acetate may be replaced by other effective waterproofing agents as stated above, but polyvinyl acetate is preferred.

The use of compositions of my present invention as insulating coatings for fuel tanks has been emphasized. However, these compositions have many other uses. They may be applied to cold surfaces to prevent sweating; to aircraft to insulate against heat and cold, to prevent sweating and to deaden sound; to a variety of metal surfaces; and to plywood and sheetrock. The bond is good and will resist weathering and abrasion excellently. For application to wall surfaces in buildings, pigments may be added to give a choice of colors.

Another important aspect of my invention is that all the materials applied to a metal surface may be, and preferably are water base materials, which permits the use of a single pump and spray equipment for an entire job.

Thus, it may be desirable to rustproof the metal surface, which can be done by spraying or brushing on a layer of an aqueous emulsion of polyvinyl acetate. Then the mixture of the present invention is sprayed on (e.g., the mixture of Example 1). Then a final coat of polyvinyl acetate emulsion is sprayed on. All three applications are water base and can be sprayed with the same equipment.

It will, therefore, be apparent that compositions have been provided which are effective as heating insulating layers or coatings even in thin layers, which bond well to a variety of underlying surfaces and which have good weathering properties.

I claim:

A composition in wet, plastic form comprising the following principal nonaqueous ingredients:

Expanded vermiculite ⎫
Expanded perlite ⎬ ---------- 100 parts by weight.
Asbestos _____ 80 to 350 parts by weight.
Sodium carboxymethyl cellulose___ 2½ to 10 parts by weight.
Basic aluminum acetate_____ 2½ to 10 ounces per 100 lbs. of aggregate.
Polyvinyl acetate_____ 25 to 100 parts by weight.

said composition also comprising sufficient water to form a plastic, extrudable mixture.

References Cited in the file of this patent
UNITED STATES PATENTS

| | | |
|---|---|---|
| 2,465,295 | Strauss | Mar. 22, 1949 |
| 2,634,208 | Miscall et al. | Apr. 7, 1953 |
| 2,662,064 | Mead | Dec. 8, 1953 |
| 2,690,594 | Kirksey | Oct. 5, 1954 |
| 2,771,456 | Konigsberg et al. | Nov. 20, 1956 |